United States Patent [19]

O'Donnell

[11] Patent Number: 5,671,701
[45] Date of Patent: Sep. 30, 1997

[54] APPARATUS AND METHOD FOR ENHANCING THE EFFICIENCY OF LIQUID-FUEL-BURNING SYSTEMS

[76] Inventor: Thomas F. O'Donnell, P.O. Box 1411, Windham, Me. 04062

[21] Appl. No.: 601,335

[22] Filed: Feb. 16, 1996

[51] Int. Cl.[6] .................................................. F02B 47/02
[52] U.S. Cl. ........................................ 123/25 A; 123/25 E
[58] Field of Search ............................. 123/25 R, 25 A, 123/25 E, 25 P, 25 Q

[56] References Cited

U.S. PATENT DOCUMENTS

| | | |
|---|---|---|
| 3,911,871 | 10/1975 | Williams et al. |
| 4,048,963 | 9/1977 | Cottell. |
| 4,080,936 | 3/1978 | Penland .................. 123/25 A |
| 4,193,009 | 3/1980 | Durley, III .............. 310/323 |
| 4,337,731 | 7/1982 | Lohberg. |
| 4,463,708 | 8/1984 | Gerry. |
| 4,476,817 | 10/1984 | Lindberg ................. 123/25 P |
| 4,625,681 | 12/1986 | Suteyiko ................. 123/DIG. 12 |
| 4,691,724 | 9/1987 | Garcia et al. ........... 310/323 |
| 4,725,226 | 2/1988 | Balsiger ................. 123/25 A |
| 4,800,848 | 1/1989 | Hubbard .................. 123/25 A |
| 5,121,713 | 6/1992 | Peterson ................. 123/25 A |
| 5,199,386 | 4/1993 | Hubbard .................. 123/25 A |

*Primary Examiner*—Erick R. Solis
*Attorney, Agent, or Firm*—Chris A. Caseiro; Thomas L. Bohan

[57] ABSTRACT

A cold-steam atomizer designed to use ultrasonics to produce mist to be mixed with a combustible fluid. The device is designed to transfer that mist/combustible fluid mixture into a combustion system in order to enhance internal and external combustion. The mist generator utilizes an immersed vibrating element to atomize a liquid such as water to create the mist. The atomizer is housed in a chamber having a baffle that is designed to prevent large droplets of the liquid from entering the combustion chamber. The system alternatively includes a tank for storing the liquid prior to atomization.

14 Claims, 1 Drawing Sheet

APPARATUS AND METHOD FOR ENHANCING THE EFFICIENCY OF LIQUID-FUEL-BURNING SYSTEMS

BACKGROUND OF THE INVENTION

1. Technical Field

The present invention relates to an atomizer that can be used in internal and external combustion systems as a way to more efficiently burn fuel in a combustion chamber. More particularly, the present invention relates to an atomizer that introduces water mist ("cold steam") to a fuel stream so that the fuel burns more efficiently in the combustion chamber. Still more particularly, the present invention relates to a design of an atomizer that uses an ultrasonic agitator to generate a water mist to be entrained into an air/fuel stream.

2. Description of the Prior Art

Combustion of liquid fuel is a well known method for generating mechanical power or heat. It is also well known that allowing a mist of water to be entrained into the fuel stream can result in a more efficient burn of the fuel. An early example of this technique is the system that atomizes water and alcohol to produce a mixed mist that is then fed into a carburetor. It is found that this increases the power generated per unit of fuel consumed. This added power means that for a given operation less fuel will be consumed and hence less of the common types of pollution associated with fossil fuel combustion will be generated. This leads to a reduction in emissions for a given work output and thereby enhances environmental quality.

Steam (i.e., gaseous $H_2O$, also called "hot steam" to distinguish it from the cloud of condensed $H_2O$ that is often called "steam" in common parlance) has also been used to increase the efficiency of such methods. The use of hot steam atomizers in commercial boilers is in fact well known. In such atomizers, saturated steam (with a temperature on the order of 220° F.) from the boiler operation is combined with a spray of fuel, such as oil or gasoline, such that the steam disperses the fuel into very small particles that burn more efficiently than would be the case if the fuel were sprayed directly (without the steam admixture) into the boiler. The steam emulsifies the fuel and expands when it reaches the hot combustion chamber, thereby increasing the surface area of the fuel that is burned.

Hot steam devices present various problems in relatively small fuel-burning systems. Such small systems are generally less efficient when hot steam is used, and they do not operate cleanly because the burn tends to be less than complete. On the whole, they also tend to consume more power because of the work required to first generate the hot steam and then to deliver that steam to the combustion chamber. The exhaust from such systems contains higher concentrations of pollutants such as carbon monoxide, carbon dioxide, or even soot (in the case of oil burners). Also, condensation occurs relatively quickly with the expansion—and therefore cooling—of saturated steam, thus reducing the fuel-burning efficiency. Condensation may also cause damage to the burner system.

In spite of these concerns, hot steam is used in large fossil-fuel plants, such as those using coal- or oil-fired boilers. In those plants, mixing saturated steam with fuel in the fire generally tends to enhance efficiency overall because the system uses steam that has already been generated downstream as part in the operation of a turbine. I.e., the steam is there for the taking. However, with a regular home-heating oil burner or in the engine of an automobile, there is no readily available steam, so saturated steam is not ordinarily used as a fuel enhancer in such systems.

Some systems have been developed using $H_2O$ mist ("cold steam") rather than hot steam. Several prior-art devices using ultrasonic transducers to generate an atomized water-fuel mixture for combustion systems have been described. They use the formation of a water-fuel emulsion as a means to enhance fuel combustion similar to that observed with the steam admixture. These processes involve first combining water and fuel into an emulsion and then atomizing the emulsion, so as to achieve a more complete combustion of the fuel.

The patent issued to Cottrell (U.S. Pat. No. 4,048,963) in 1977 describes a device used to deliver an emulsified water/fuel mixture to a combustion system. The emulsion is then atomized using a sonic agitator. One problem in working with an emulsion is that the emulsifier needs to be close to the spray plate (used to spread the fuel mixture as it enters the combustion chamber). Otherwise, separation of the water-fuel mixture tends to occur prior to combustion, reducing the efficiency by a large amount below what it would be were there no water at all in the combustion chamber. Thus, because maintenance of a complete and uniform mix without separate atomization is extremely difficult given the nature of the components, emulsification is not as helpful in increasing fuel-burning efficiency as might be thought.

The patent issued to Gerry (U.S. Pat. 4,463,708) in 1984 also describes a liquid-fuel/water mixing device that uses an ultrasonic exciter. The Gerry device emulsifies the water and fuel as did Cottrell and thus suffers the drawback of having to be located close to the spray plate. It also suffers in that it does not provide for a complete mixture without separate atomization and subsequent complete combination with the fuel.

The patent issued to Williams et al. (U.S. Pat. No. 3,911,871) in 1975 describes an injection system that combines liquid water and fuel inside an intake manifold. Water is either pumped or flows into the manifold and is atomized using a transducer controlled by an oscillator. The transducer is located inside the manifold. Such a design can present problems because the transducer is in direct contact with the water-transfer area. If the transducer fails to vibrate because of a faulty oscillator, a faulty piezoelectric device, or another related malfunction, large droplets of water will enter directly into the intake manifold. This will result in reduced efficiency and is likely to cause engine damage.

Another problem with the Williams et al. device is that it is not "parasitic." That is, it is installed inside the intake manifold rather than at some location external to the manifold where it can easily be installed, maintained, and removed if necessary. This requires modification of the existing engine components, including, but not limited to, drilling at least one hole in the side of the manifold. Such a device is difficult to install in the vehicle and would require unique designing for each engine component. Similar problems would arise in using the Williams et al. device in an oil-fired burner. This increases the cost of manufacturing and increases the difficulty of fabrication. It also directly interferes with the air intake capacity of the manifold. Thus, either a larger intake is required or other alterations must be made.

Yet another problem with the Williams et al. design is that the transducer element disclosed in that reference is directly exposed to air coming into the intake manifold. Moreover, water droplets are permitted to fall directly onto the vibrator. With this exposure, the transducer is likely to burn out more quickly than if it was not so exposed, because under such conditions the vibrating element of the transducer can vibrate freely without an opposing force that would, in effect, regulate its operation. On the other hand, if the vibrator (agitator) element is completely immersed in liquid—as is generally intended in the design of such devices—it operates in a more uniform manner.

Therefore, what is needed is an atomizing apparatus and method that better enhances fuel consumption efficiency, thereby further reducing exhaust emissions. In particular, what is needed is an atomizer that creates water mist ("cold steam") that can be efficiently combined with fuel in a complete and uniform mixture. In addition, what is needed is such an atomizer design that will not inject relatively large water droplets or other fluid directly into a combustion chamber as the result of, for example, failure of the mist-generating agitator. What is also needed is such an atomizer that can be positioned outside of the direct operation of a manifold. What is further needed is such an atomizer that is inexpensive to produce and install. Finally, what is needed is an atomizer system that ensures that the agitation component of the system is not permitted to vibrate freely.

SUMMARY OF THE INVENTION

It is an object of the present invention to provide an atomizer that enhances liquid-hydrocarbon-fuel combustion, thereby reducing exhaust emissions. It is a particular object of the present invention to provide an atomizer that includes an efficient water-mist creator leading to a more complete mixture of the water mist and a combustible fluid than has been achievable heretofore. It is a yet another object of the present invention to provide a fail-safe design that will not inject relatively large water droplets or other fluid droplets directly into a combustion chamber upon failure of the agitator device. It is another object of the present invention that its atomizer can be mounted outside of a manifold when used with a combustion system having such a component. It is still a further object of the present invention to provide such an atomizer that is inexpensive to produce and install. Finally, it is an object of the present invention to provide such an atomizer system with an agitation device that is not exposed directly to air.

The noted objectives are achieved in the present invention through the introduction of a cold-steam generator, that is, a device that takes a liquid, generally water, at a temperature below its boiling point and disperses it as a fine mist of liquid particles. The liquid remains just that and is not a gas (in contrast to hot steam). This invention then combines that mist with a stream of combustible fluid, also dispersed in fine droplets. It is to be noted that while the focus of the discussion of the present invention is to the use of water as the fuel carrier, alternative suitable liquids of reasonable boiling point may be used as well, including, but not limited to alcohol and water in combination with alcohol. It is further to be noted that while the focus of the discussion of the present invention is to internal fuel-combustion engines, it is applicable to any hydrocarbon-fuel-burning system.

An immersed ultrasonic transducer is used to atomize the water to generate the mist. For a typical vehicle engine, it has been found to be sufficient to use approximately one gallon of liquid per tankful of fuel in order to produce a suitable quantity of mist. This volume of liquid can easily be placed within the engine compartment. The mist created is then directed to an air-intake unit, mixed with additional air in the air-intake unit, then mixed with the combustible fluid as stated. This air/water/fuel mixture is then delivered to a combustion chamber. The combustion chamber may be in a residential hot water heater, in a residential or industrial boiler, in an automobile engine, or in any other type of internal- or external-combustion engine that operates by burning liquid hydrocarbons. Because the ultrasonic generation of the cold steam requires no heating of its own, this system is generically more efficient than those that require the separate generation of hot steam for this purpose. The overall efficiency of the total system is thereby enhanced.

The present invention uses a more efficient method for atomizing a combustible fluid mixture than does the prior art discussed above. Part of this enhance efficiency is accomplished by completely immersing the vibrator element within the liquid to be atomized. The transducer is preferably designed to cease operation whenever the vibrator element ceases to be completely immersed in this liquid, so as to prevent damage to the transducer. This may be achieved by controlling the level of that liquid using a float valve in the agitation chamber, and a turn-off switch coupled to that valve and to the transducer. The transducer may be operated within any suitable range of frequencies, provided the energy transmitted to the liquid is sufficient to create an adequate quantity of atomized liquid. For the preferred embodiment of the present invention, the vibrator element of the transducer operates at a frequency of about 1.5 MHz, and mixes the atomized liquid with air that is inside the chamber above the liquid. This air-mist mixture is then pulled into the intake of the combustion system. In the case of an internal combustion engine such as the type used to power automobiles, this pulling in can be accomplished by the vacuum created by known intake manifold designs. Larger droplets of water resulting from the splashing within the agitation chamber of the transducer are prevented from entering the combustion region by a baffle preferably positioned above the water in the agitation chamber. These large droplets of water then fall back into the bulk liquid and are re-introduced to the vibrator element so as to be atomized. By this technique, only true mist enters the intake manifold.

In the case of systems incorporating intake manifolds, the mist mixes with more air from the air intake before the mixture enters the manifold. The resulting mixture is then combined with fuel for combustion. The pre-mixture of the water with air before mixing with the combustible fluid increases the efficiency of the system by providing a more complete mixture of the water and air. Cross currents in the intake manifold or carburetor homogenize the mixture even more fully. The source of the increased efficiency achieved by this mixture is thought to result from the fuel adhering as a thin film on the surface of the non-combustible droplets, thus increasing the surface area of the fuel. This provides for a heightened opportunity for the fuel to become oxidized as it passes through the combustion chamber. Latent heat of vaporization expands the size of the fuel-coated water particles, further increasing the efficiency of the combustion by further increasing the surface area of the fuel to be burned.

As indicated, the present invention does not use ultrasonics to mix the fuel and water in bulk liquid form prior to atomization of the water. Cottrell and Gerry, on the other hand, mix the fuel and water prior to atomization. Such a process is not as efficient because separation of the components is much more likely to occur. Also, emulsifying the fuel and water directly (prior to the atomization) is not as efficient. A complete mix cannot be obtained without separate atomization and subsequent combination with the fuel.

The present process and device provide for a more effective burning of the fuel, reducing the carbon monoxide and carbon dioxide contents of the exhaust. Such a device and its method of operation may well be used to reduce the need for an optimal catalytic converter and may possibly render that catalytic converter unnecessary. The present device is also desirable in that it reduces the output of nitrous oxides, a known pollutant. It is well known that as an engine or burner output increases, the temperature of that system increases. Such an increase causes an increase in nitrous oxide output. The cooling effect of the liquid mist, whether that liquid is water, alcohol, some combination thereof, or some other suitable liquid, prevents the engine or burner from reaching the critical temperature associated with increased nitrous oxide formation. Moreover, an added benefit of any increase in engine temperature is the formation of hot steam, as defined above, within the combustion chamber. This steam creates a "steam engine" effect in that there is increased pressure within the chamber, which increases the work output of the system.

The present invention is designed to be fail-safe in the event of transducer failure. If the transducer should fail for any reason, no water would enter directly into the intake manifold, in clear contrast to what would occur in the Williams et al. system, Breakdown of any of the components in the present invention will not lead to any other components of the system being damaged. This is, in part, because the separate agitation chamber incorporated into the present invention. In its preferred embodiment, the agitation chamber is connected outside the manifold. Furthermore, sizeable water droplets are separated from the mist in the agitation chamber, so that only fine mist droplets reach the intake manifold, or other element leading to the combustion chamber of the overall system. This contrasts with the Williams et al. design in that there is no direct insertion of water into the intake manifold. Nevertheless, the present invention is not precluded from being safely inserted into the manifold. Although such an adaptation would require extra work and alteration of the engine (and could possibly interfere with the air intake specifications of an engine), it would still provide fail-safe operation in the event of a transducer failure.

The fact that the present invention in its preferred design is a non-intrusive parasitic device provides added advantages. In the preferred embodiment, the present invention is bolted to the outside of the intake manifold and can simply be used to deliver the mist to the air intake that is designed to deliver air to the carburetor. No modification of the existing engine components is necessary. Thus the present invention is easier to install in the vehicle and does not interfere with the air intake capacity of the manifold. The cost of manufacturing is reduced and the difficulty of fabrication is simplified.

A kit for the present invention could be made available for easy installation on combustion systems. In the preferred embodiment, the kit would include: a container for housing the water; a transducer element adapted to be inserted into the container; a baffle; and a storage tank for storing the water. The kit would also include any wires, tubes, hoses, or control attachments depending on the system being modified. For example, a kit for an automobile may include detectors for speed/acceleration controls. Modifying an oil burner would likely be even easier because the oil burner has preset operating parameters (e.g. gal./min.). In addition, a kit for a burner would not require all the sensing devices that are needed for an automobile (e.g. speed detectors, etc.); however, some control of the device would of course be necessary.

In a typical oil burner system, the present invention can be supplied with water from the available building supply, such as city or town water fed to a home, or water from a well. The water pressure is first reduced from inlet to essentially atmospheric and then directed to a holding tank. The holding tank is much like the holding tank for a toilet, which includes a float valve or similar water-level sensor with a water inlet shut-off. Of course, the level sensor is preferably coupled to a switch used to turn off the vibratory transducer located within the tank. The transducer is also coupled to a sensor, such as the "fire eye," used to determine whether the burner flame is on. This is necessary in order to ensure that the mist generated by the transducer is only mixed with the fuel and directed into a combustion atmosphere. If no flame exists, one would simply be delivering water into the combustion chamber where it would likely pool and cause a flooding of the chamber with fuel, water, or a combination of the two. A hose having one end located above the water level within the holding tank is directed into the air inlet of the fuel burner such that the operation of the forced-draft blower of the burner draws the air as well as the mist into the fuel stream prior to combustion. This is necessary—as it is in the vehicle engine—in order to ensure that the mist will not simply remain floating just above the water in the tank—much like a fog—rather than moving into the chamber.

While the use of ultrasonically-created mist is known generally in the field of combustion systems, the present invention provides an aspect that is not known: complete immersion of the agitator element in the liquid to be atomized. Such complete immersion more efficiently produces cold steam. Unlike the Williams et al. device, the agitator element of the present invention is shallowly but completely immersed in water so as to be exposed to a constant inertial force as it oscillates. If the water is too shallow, the float valve in combination with a switch will shut down the transducer. In the Williams et al. device, droplets drip onto the transducer, in a way similar to the dripping of water onto a hot frying pan. In that situation, a significant portion of the agitator face—and thus a significant portion of the transducer energy—is not used to generate the mist. In contrast, the present invention uses the entire agitator face for transferring energy to the liquid and hence for mist generation. Further, the present system isolates any large droplets and transfers them back into the agitation chamber. In normal use, the large droplets splash up into the transfer tube, but are prevented from entering the intake manifold by a baffle located above the water level. The droplets fall back into the agitation chamber and are re-agitated. Thus, only mist enters the intake manifold.

Although the present invention depends in one way upon gravity for its operation, it is distinguished from the gravity operation suggested by Williams et al. where that prior art discusses the possibility of eliminating the pump and relying on the force of gravity to feed water into the intake manifold instead of the pump. The present invention uses gravity in a different manner, only relying upon it to pull the larger drops back down into the agitation chamber so that only mist enters the manifold. The Williams et al. design simply would run water directly into the manifold; gravity would play no part in the separation of the larger water droplets from the mist.

For use in a vehicle, the controls of the present invention are preferably mechanical devices, rather than sensing devices, that are connected to the accelerator. In this way, there is an increase in the amount of mist drawn from the agitator as a function of an increase in acceleration. Of course, it is easily applicable to fuel-injected engines of any size as well.

The present invention is an efficient system. A low-power transducer is used, preferably one requiring only 40 Watts of power to operate, and results in better efficiency and cleanliness in the system. The exhaust created by the fuel consumed contains less pollutants such as carbon monoxide, carbon dioxide, or soot as found in oil burners. Of course, given the added water mixture, less fuel is consumed in achieving the same output.

The preferred method of efficiently directing fuel into a combustion chamber includes atomizing liquid, such as water, to form a mist; mixing the mist with air in a chamber; combining the air-mist mixture with additional air in the intake of a combustion system; and then combining that mixture with fuel for combustion.

These and other advantages of the present invention will become apparent upon review of the submitted drawings, the detailed description of the device and process, and the appended claims.

DETAILED DESCRIPTION OF THE PREFERRED EMBODIMENT

Figure 1:
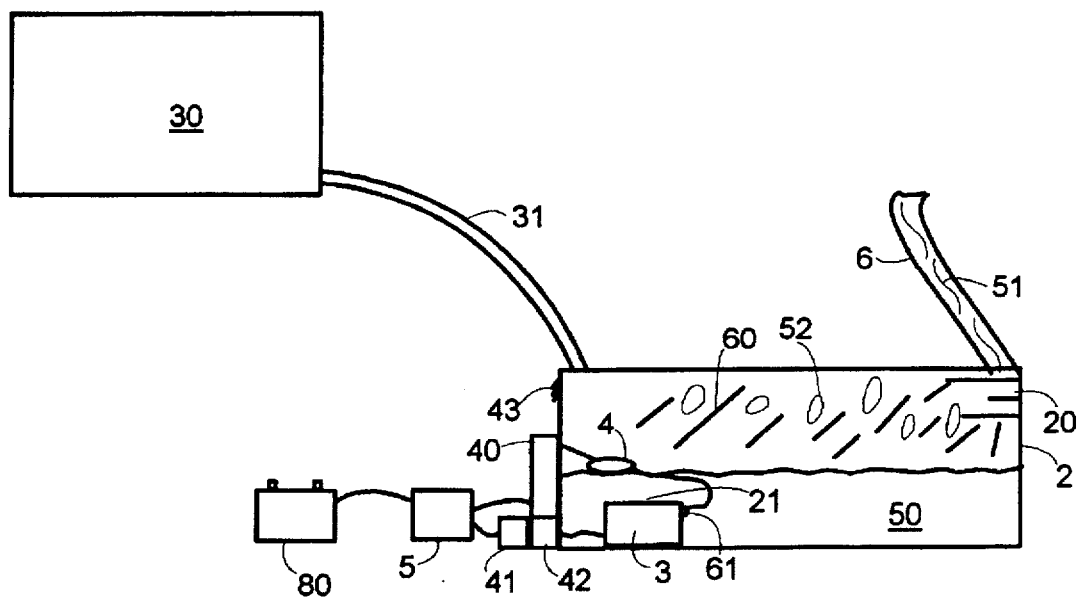
FIG. 1 shows a simplified diagrammatic sketch of the preferred embodiment of the present invention.
Figure 2:
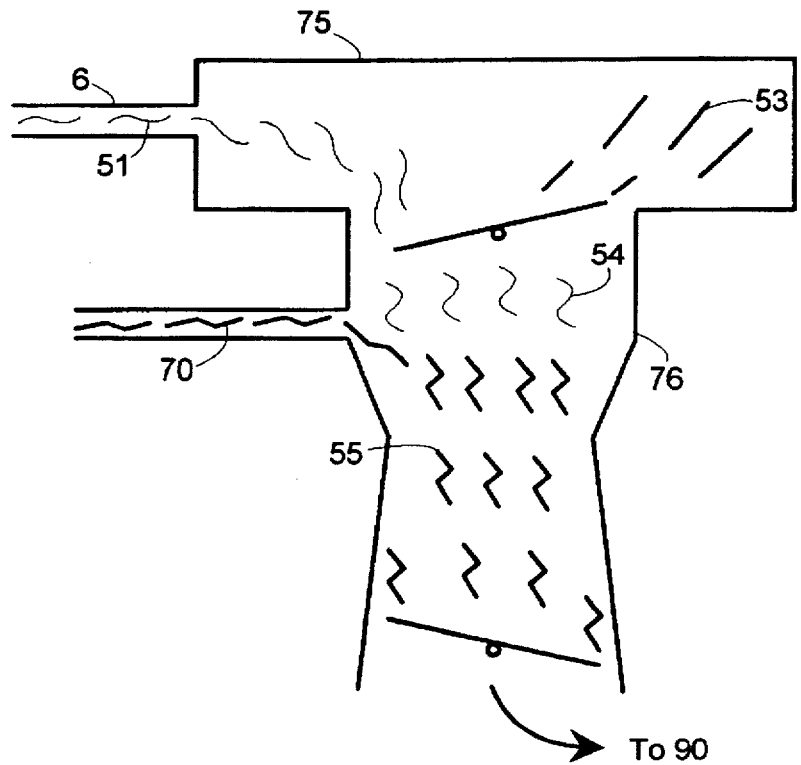
FIG. 2 shows a simplified diagrammatic representation of the delivery of the created mist to the air intake and carburetor of an internal combustion engine.

The general operation of the preferred embodiment of the present invention is illustrated in FIGS. 1 and 2 by a cold mist atomizer 1, comprising an agitation chamber 2, a splash baffle 20, a storage tank 30, and controls 40. The objective of the cold steam atomizer 1 is to atomize a liquid 50, which is preferably water, and combine it with air to form a cold mist 60. Of course, alcohol may also be used as the liquid 50, as it enhances engine cooling when used. The mist 60 is then mixed with a combustible fluid 70 such as gasoline or heating oil to form a fuel-mist mixture 55 for burning in a combustion system.

In an automobile, for example, the agitation chamber 2 is mounted below an air intake unit 75 used to deliver combustion air to an intake manifold 90 that forms part of a standard combustion system (not shown). The atomizer 1 utilizes an ultrasonic transducer 3 that is immersed in the liquid 50. The transducer 3 is mounted within the agitator chamber 2 so that the transducer 3 vibrates in a substantially vertical direction. The transducer 3 atomizes the liquid 50 through cavitation rather than through spraying, thus forming the cold mist 60. The cold mist 60 is mixed with air within the chamber 2 to form a first mist-air mixture 51. The agitation chamber 2 includes a float valve 4 to maintain a specified amount of the liquid 50 within the agitation chamber 2. Vents 43 ensure a constant supply of air into the chamber 2 for mixing with the cold mist 60.

The transducer 3 generally operates at a single frequency and at a variable amplitude, although it should be well understood that the frequency may be changed in order to obtain varying results in different situations or applications. In the preferred embodiment of the present invention, the transducer 3 is operated at about 1.5 MHz. A variable potentiometer 5 regulates the voltage in order to modify the amplitude of vibration. Modification of the amplitude of vibration of the transducer 3 by means of a standard coupled electromechanically-controlled oscillator 42 that affects the resultant mist output. The potentiometer 5 is preferably connected to the oscillator 42 and to a transducer controller 41 contained within a controller unit 40 of the system. The entire unit is readily operated using a standard 12-Volt automobile battery 80.

The float valve 4 controls the volume of the liquid 50 inside the agitation chamber 2. The float valve 4 will maintain a minimum liquid level above a transducer face 21 of approximately ½". The liquid 50 is preferably supplied from the storage tank 30, which should be positioned above the agitation chamber 2 in order to permit gravity feeding of the liquid 50 into the chamber 2 via a standard delivery hose 31 that may be made of plastic or other suitable material. If the supply of the liquid 50 is exhausted, the float valve 4 will be used to flip a low-level switch 61 to shut down the transducer 3 in order to prevent damage to the transducer 3.

The agitation chamber 2 is coupled to the air intake 75 by tubing 6. The splash baffle 20 is optionally incorporated into the tubing 6. In the preferred embodiment of the invention, the tubing 6 is 1.5-inch diameter rubber tubing. It should be understood that various sizes and types of delivery systems may be used in place of the tubing 6. As the transducer 3 vibrates, the liquid ,50 splashes up into the tubing 6 and the splash baffle 20. The splash baffle 20 allows the atomized mist 60 to pass to the next location, but prevents larger liquid droplets 52 from entering the air intake 75. The larger droplets 52 fall back into the agitation chamber 2 for re-agitation. In the preferred embodiment of the present invention, water droplets that are at least about 0.2 microns in diameter will not be permitted to pass through the tubing 6.

A convenient feature of the present invention is that the first mist-air mixture 51 passes through the tubing 6 directly into the air intake 75 in such a way that no modification of the existing engine compartment is required. As the mixture 51 enters the air intake 75, it mixes with a second supply of air 53 prior to mixing with the fuel 70. Mixing the first mist-air mixture 51 with the second supply of air 53 results in better agitation of the water and air, thus providing a rich second mist-air mixture 54 before contacting the fuel 70. As the second mist-air mixture 54 comes into contact with the fuel 70, the surface area of the fuel 70 is increased, thus providing better combustion as previously noted. Cross currents in a carburetor 76 of the automobile agitate a fuel-mist-air mixture 55 even more efficiently. This process first dilutes the second mist-air mixture 54 and then the fuel 70, providing a much more efficient burn of the fuel 70.

Automatic and manual controls 40 such as heat sensors, vacuum sensors, timers, and acceleration (speed) sensors are coupled to the agitation chamber and cause an increase or a decrease of the drawing-in of the fluid mixture into the air intake 75. For example, in an automobile, vacuum sensors control vacuum advance on regular ignition. When the accelerator is pressed, more vacuum is created and there is an increase in the output of the agitation chamber 2. Depending on the system, any of these controls may or may not be necessary. Specifically, while the automobile may require the use of a speed sensor, a fuel-burning boiler would not have a speed sensor, but may have a temperature sensor. As a result, for the burner, the operation of the atomizer 1 would be essentially as described for an automobile, absent the more involved air intake arrangement of the vehicle. In particular, as earlier noted, the available water supply may be tapped as the source of water for the formation of the mist. The forced-draft blower of the furnace can be used to draw the mist as well as the required air supply into the burner system. Similarly, it is preferable to include as part of the control system a temperature sensor coupled to the switch 61. The temperature sensor will cause a delay in the formation of the mist 60 until the combustion chamber reaches a temperature that ensures that the mixture 55 will remain a vapor.

Although the preferred embodiment of the present invention has been described herein, it is to be understood that the above description is merely illustrative. Other means and methods may be substituted for particular features and processes without deviating from cold steam atomizer 1 as described herein. Accordingly, it is to be understood that the present invention is not limited to that precisely shown and described.

I claim:

1. An apparatus for producing a mist to be combined with a combustible fluid to enhance combustion of the combustible fluid within a combustion chamber, the apparatus comprising:
    a. an ultrasonic transducer for producing a mist from a liquid by agitating said liquid without spraying said liquid;
    b. a container for housing said ultrasonic transducer within said liquid, wherein said ultrasonic transducer is designed to remain completely immersed within said liquid; and
    c. a baffle means coupled at a first end thereof to said container and couplable at a second end thereof to an air inlet means of said combustion chamber, wherein said baffle means allows said mist to enter said air inlet means with said combustible fluid while preventing droplets of said liquid from entering said air inlet means.

2. The apparatus as claimed in claim 1 wherein a voltage supplied to said ultrasonic transducer is controlled by a potentiometer.

3. The apparatus as claimed in claim 1 wherein said liquid is water.

4. The apparatus as claimed in claim 1 wherein said container includes a float valve for controlling a level of said liquid to be agitated.

5. The apparatus as claimed in claim 1 wherein said housing is detachably and non-intrusively coupled to said air inlet means.

6. The apparatus as claimed in claim 5 wherein said combustion chamber is an automobile engine and said air inlet means is an air intake manifold.

7. The apparatus as claimed in claim 1 further comprising a tank for storing said liquid, wherein said tank is coupled via a hose to said container.

8. The apparatus as claimed in claim 7 wherein a voltage supplied to said ultrasonic transducer is controlled by a potentiometer.

9. The apparatus as claimed in claim 7 wherein said liquid is water.

10. The apparatus as claimed in claim 7 wherein the volume of said liquid within said housing is controlled by a float valve.

11. The apparatus as claimed in claim 6 wherein said housing is attached outside of said air inlet means.

12. The apparatus as claimed in claim 11 wherein said combustion chamber is an automobile engine and said air inlet means is an intake manifold.

13. A method of producing a mist to be combined with a combustible fluid for combustion of said combustible fluid, said method comprising the steps of:
    a. agitating a liquid with an ultrasonic transducer to produce a mist without spraying said liquid;
    b. housing said mist in a container;
    c. isolating said mist from large droplets of said liquid prior to introducing said mist to an air intake of a combustion chamber; and
    d. combining said mist and said combustible fluid together for combustion in said combustion chamber.

14. The method as claimed in claim 13 wherein the step of combining said mist and said combustible fluid includes the steps of:
    a. pre-mixing said mist with a first supply of air contained within said container to form a first air-mist mixture;
    b. mixing said first air-mist mixture with a second supply of air to form a second air-mist mixture; and
    c. mixing said second air-mist mixture with said combustible fluid.

\